United States Patent
Fukuda et al.

(12)
(10) Patent No.: US 6,329,991 B1
(45) Date of Patent: *Dec. 11, 2001

(54) DATA PROCESSING METHOD AND APPARATUS

(75) Inventors: Ryoji Fukuda, Kawasaki; Takashi Harada, Yamato, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/632,620

(22) Filed: Apr. 15, 1996

(30) Foreign Application Priority Data

Apr. 18, 1995 (JP) .................................... 7-116417

(51) Int. Cl.[7] .................................... G06T 11/00
(52) U.S. Cl. ............................. 345/435
(58) Field of Search .................. 395/140–142, 395/133; 345/440–442, 433, 435

(56) References Cited

U.S. PATENT DOCUMENTS 5,361,310 * 11/1994 Ishigaki ................................. 382/13
5,478,976 * 12/1995 Kano ...................................... 178/19

FOREIGN PATENT DOCUMENTS 0367405   5/1990   (EP) .
0495612   7/1992   (EP) .

OTHER PUBLICATIONS

Patent Abstracts of Japan, vol. 12, No. 417 (P–782), Nov. 7, 1988 & JP–A–63 155370 (Fujitsu Ltd), Jun. 28, 1988.

* cited by examiner

Primary Examiner—Almis R. Jankus
(74) Attorney, Agent, or Firm—Fitzpatrick, Cella, Harper & Scinto

(57) ABSTRACT

The invention provides a data processing method and apparatus in which, even in a case of overlappingly displaying a plurality of traces, those traces can be distinguished and observed, and input time points of the traces can be distinguished by merely seeing the traces. Another object of the invention is to provide a data processing method and apparatus in which time information of time points when a plurality of sets of image information are inputted is stored so as to correspond to each set of image information, and each set of image information is displayed with each attribute (e.g., brightness, thickness or color) that is automatically determined in accordance with an elapsed time in accordance with the time information, so that a plurality of sets of image information inputted in a state in which they can be displayed on the same picture plane can be easily discriminated.

37 Claims, 7 Drawing Sheets

DATA PROCESSING METHOD AND APPARATUS

BACKGROUND OF THE INVENTION

1. Field of the Invention

The invention relates to a data processing method and apparatus which can input and output trace data.

The invention also relates to data processing method and apparatus which can input and output image data.

The invention further relates to a data processing method and apparatus which can output image data in various forms by changing attributes of the image data designated.

2. Related Background Art

As an information terminal apparatus of the type such that an operating instruction and data are inputted by a trace written by a pen, for example, there has conventionally been known an apparatus in which fundamental software such as "Windows for Pen Computing" (registered trade name), made by Microsoft, "PenPoint" (registered trade name), made by Go Corporation, or the like is installed.

In the above conventional apparatuses, however, if a trace is inputted overlapping a previously-drawn trace, since the traces are displayed by the same attributes, the traces on a display screen become complicated, it is very hard to see the traces, and operating efficiency is poor. Further, the input times of the displayed traces cannot be distinguished.

Hitherto, there has been known an apparatus such that when a trace is drawn or an image is inputted, attributes such as color, line type, line width, area type, and the like of the trace or image are designated and the trace or image is displayed or printed on the basis of the designated attributes.

In the above conventional apparatus, however, when attributes of a trace or image which are newly inputted are designated to be different from the attributes of the trace or image which has already been inputted, an operation to change the attributes has to be performed. In the case where the attributes of at least two traces or images which have already been inputted are changed to different kinds of attributes as well, on the other hand, an operation to specify the trace or image as the target of a change in attributes and an operation to change the attributes are needed.

SUMMARY OF THE INVENTION

The invention is made in consideration of the above drawbacks, and it is an object of the invention to provide a trace input/output electronic apparatus and its display control method, in which even if many traces are overlapped and inputted, the traces can be distinguished and input time points of the traces can be distinguished by merely seeing the traces.

Another object of the invention is to provide a data processing method and apparatus in which, even if the sets of designated attributes are not different, the operator can discriminate a plurality of traces or images which are outputted to the same picture plane, an operation to designate attributes is unnecessary, and operating efficiency is high.

DETAILED DESCRIPTION OF THE PREFERRED EMBODIMENTS

Embodiments of the invention will now be described hereinbelow with reference to the drawings.

[First Embodiment]

Figure 1:
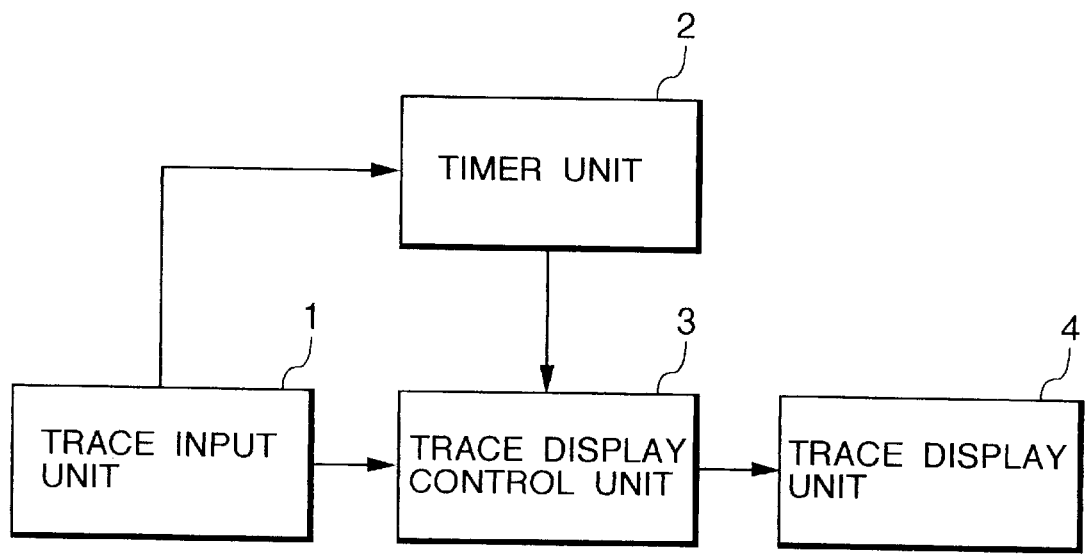
FIG. 1 is a diagram showing a construction of a preferred embodiment the invention.
Figure 2:
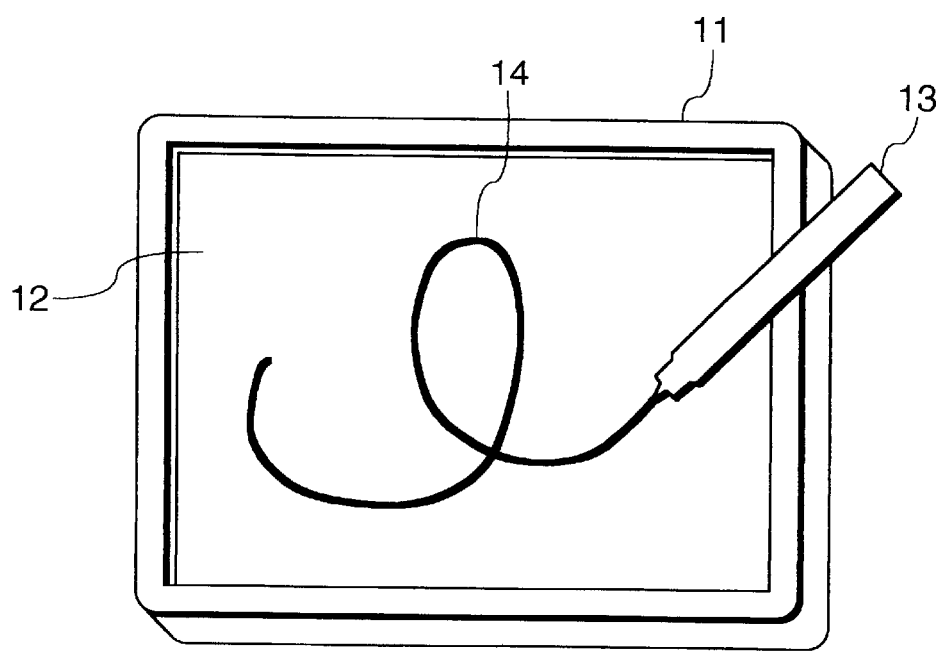
FIG. 2 is an external view of a trace input/output electronic apparatus according to one embodiment of the invention.

FIG. 2 is an external view of a trace input/output electronic apparatus according to an embodiment of the invention. A liquid crystal display 12 with a digitizer is provided for a casing 11. When a trace is inputted by a trace input pen 13, a trace 14 is displayed on the display 12.

Figure 3:
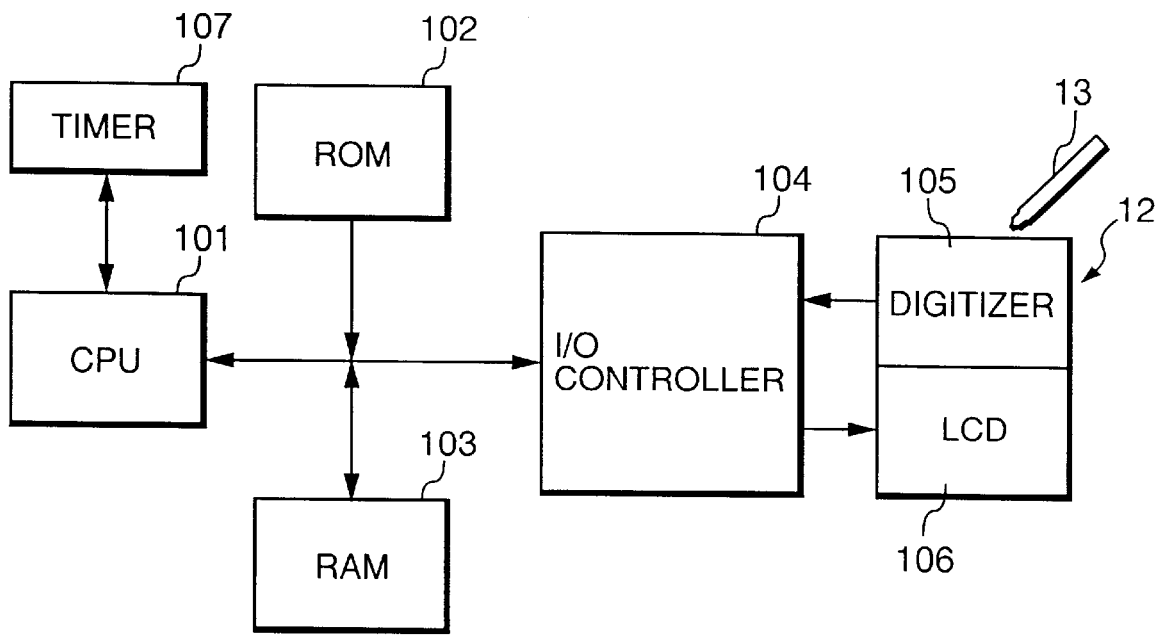
FIG. 3 is a block diagram showing a construction of the apparatus of FIG. 2.

FIG. 3 is a block diagram showing a construction of the apparatus. The apparatus comprises: a CPU 101 for controlling the whole apparatus; a ROM 102 for storing a control program or the like of processes which are executed by the CPU 101, including, for example, processes shown in flowcharts, which will be explained hereinbelow, or the like; a RAM 103 to store data during arithmetic operations of the CPU 101 or the like; a digitizer 105 for detecting a contact position of the trace input pen 13 and inputting image data comprising a trace written by the pen as a coordinate dot train, a display 106 such as liquid crystal display, CRT, or the like; an I/O controller 104 to which the digitizer 105 and liquid crystal display (LCD) 106 are connected and which functions as an interface of a data input/output and an operation input; and a timer 107 for measuring time.

Figure 4:
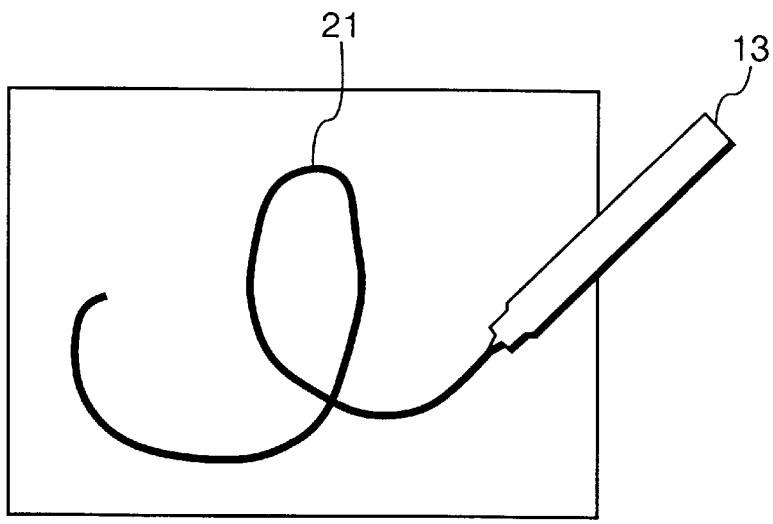
FIG. 4 is a diagram for explaining a display form of a trace.
Figure 5:
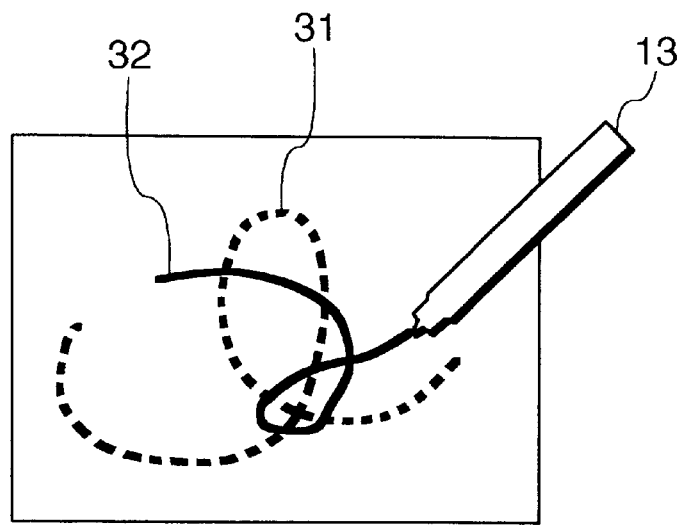
FIG. 5 is a diagram for explaining a display form of a trace.

A trace is inputted by the exclusive-use trace input pen 13. A line is drawn at a position corresponding to the LCD 106 on the basis of coordinate data which is sent from the digitizer 105 to the CPU 101. FIG. 4 shows a display picture plane at that time. A trace 21 is displayed by a dense solid line. FIG. 5 shows a case where a new trace 32 is inputted. However, brightness, which is one display attribute of the trace 21 which has already been drawn, is changed to a lower value, so that what was shown as trace 21, now appears as trace 31.

A control program for the CPU 101 to execute various processes, which will be explained in the following, can be stored in the ROM 102 in advance. However, it is also possible to the apparatus in a manner such that prior to executing the process, a control program stored in another memory medium is read out therefrom, is stored into the RAM 103 and is used. As another memory medium in this case, it is possible to use an FD, a CD-ROM, or the like which is detachably connectable to the apparatus, or a memory medium of another apparatus which can transmit and receive data through a public line or a LAN.

As means for inputting an image, in addition to a trace input pen and a digitizer, another input unit such as touch panel, mouse, or the like which can input an image can be used. Or, an image inputted by another apparatus can be also inputted through the public line or LAN.

The process in the CPU 101 for realizing the above operations will now be described with reference to the flowcharts of FIGS. 6 and 7.

Figure 6:
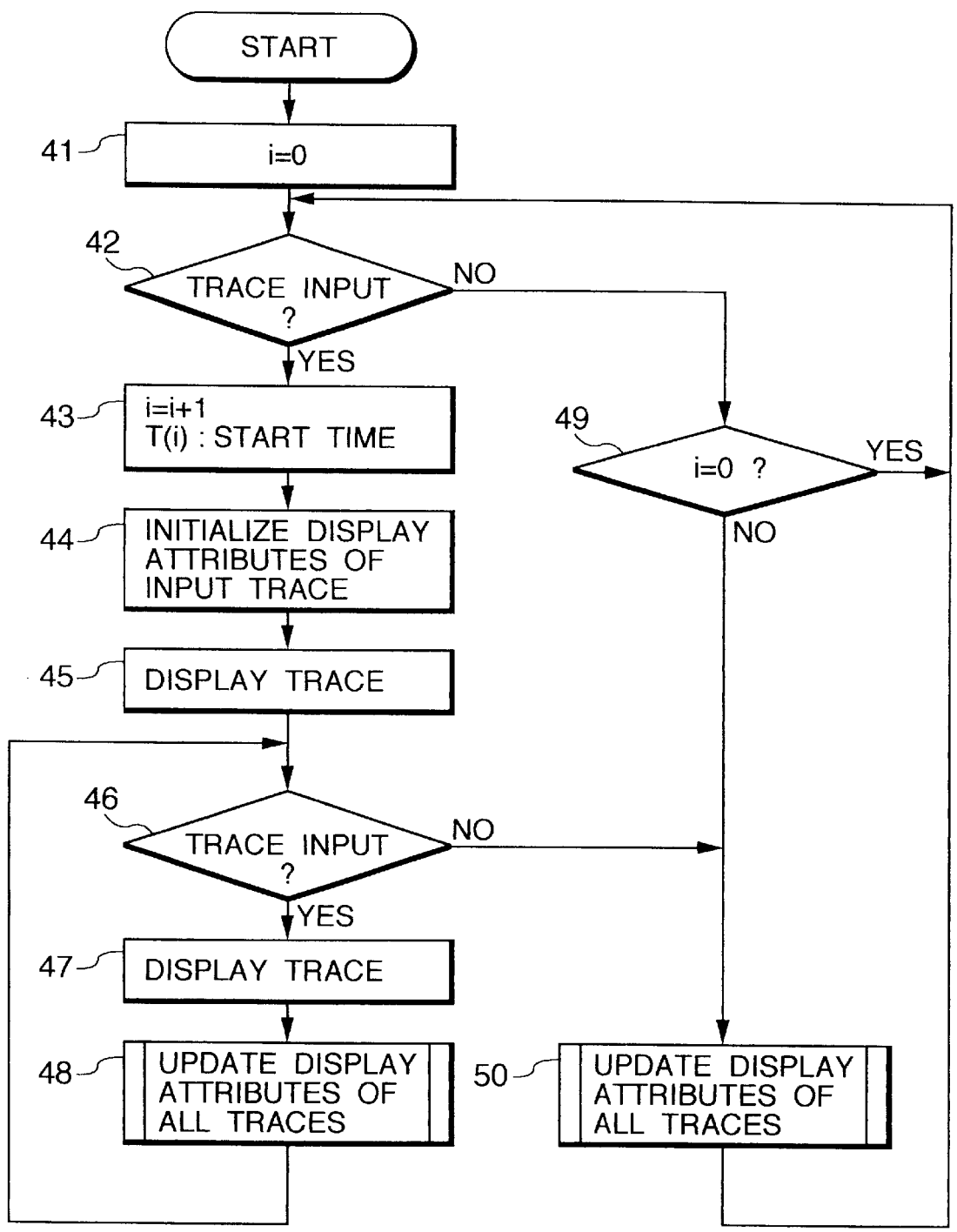
FIG. 6 is a flowchart for a display control process of a trace.

In FIG. 6, since a trace is not yet inputted in step 41, 0 is set as the value of a variable i. In step 42, a check is made to see if a trace has been inputted from the digitizer 105. If YES, step 43 follows. If NO, step 49 follows. In step 49, when i=0, the processing routine is returned to step 42. If NO, step 50 follows (that is, i indicates the number of traces to be displayed on the display 106). The value of i is increased by "1" at a time point when the pen is put down on the screen. Namely, when there is no trace, no operation is performed, and the apparatus is returned to a wait state, to wait for an input.

In step 43, the value of the variable i is increased by "1", and a time to start the drawing is measured by the built-in timer 107 and is stored as T(i) into the RAM 103. In step 44, display attributes of the inputted trace are initialized. In this instance, the brightness of the trace is set to the maximum value. In step 45, the trace is displayed on the LCD 106 on the basis of coordinate data stored in the RAM 103 in correspondence to T(i) that is inputted as an i-th trace. In step 46, a check is made to see whether the pen has been taken from the screen or the inputting of the trace is continuing. When the trace is inputted, step 47 follows. When the pen is taken up and the inputting of the trace data is finished, step 50 follows. In step 47, the trace is displayed in a manner similar to step 45. In steps 48 and 50, a process to change the display attributes of all of the traces shown in FIG. 7 is executed. After completion of step 48, the processing routine is returned to step 46. When step 50 is finished, the processing routine is returned to step 42.

Figure 7:
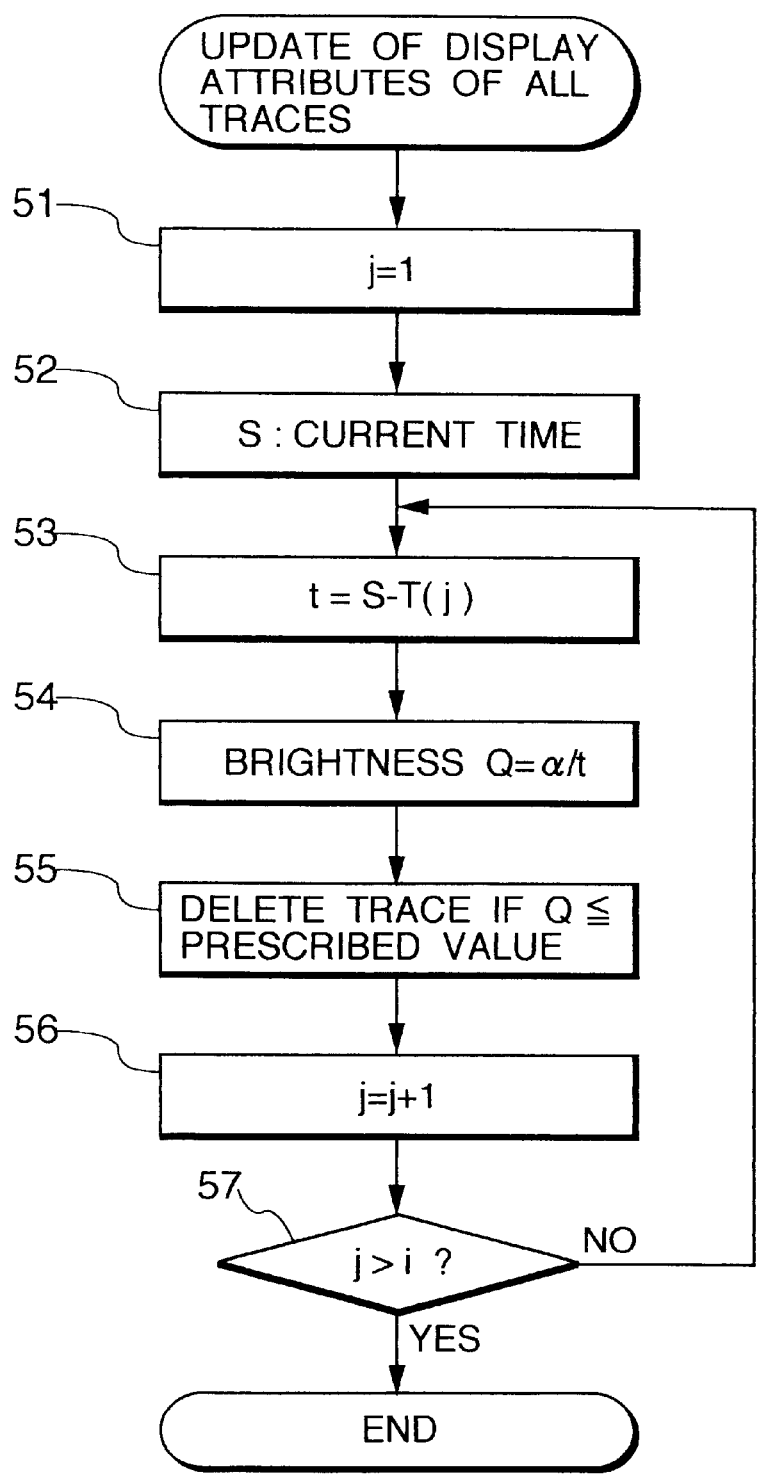
FIG. 7 is a flowchart showing in detail a part of the process in FIG. 6.

FIG. 7 is the flowchart for the process to change the display attributes of all of the traces in steps 48 and 50. In step 51, a variable j is set to "1". In step 52, the current time is read out from the built-in timer 107 and set as the value of a variable S. In step 53, t=S−T(j) is executed as an elapsed time when the trace is displayed. In step 54, the brightness Q of the trace is calculated by $\alpha/t$ ($\alpha$ is a constant) and is set as a display attribute. In step 55, when Q is equal to or less than a predetermined prescribed value, the trace is deleted. In step 56, j=j+1 is executed. In step 57, when j is larger than the number of traces (i), the processing routine is finished. If NO, the processing routine is returned to step 53.

Figure 8:
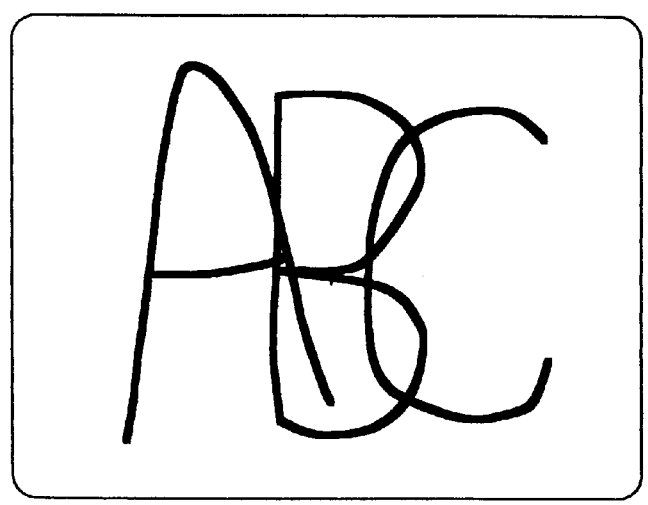
FIG. 8 is a diagram for explaining a display form of a trace.
Figure 9:
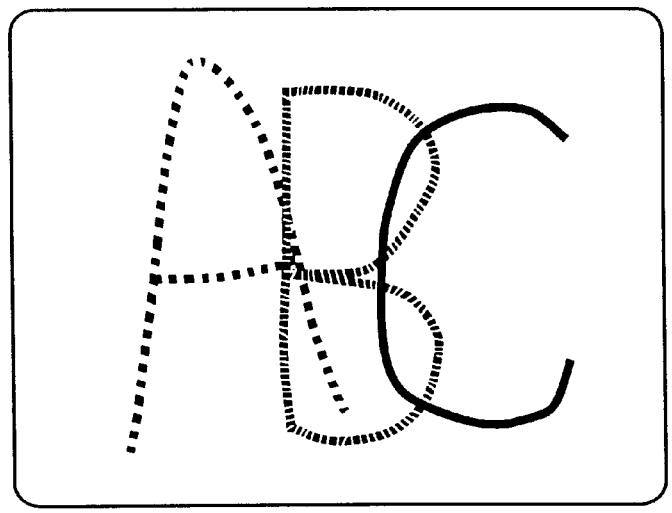
FIG. 9 is a diagram for explaining a display form of a trace.

By the above processes, even when a trace overlapping a previously-drawn one is inputted, a difference between the new and old traces can be recognized, and the user is not confused. Hitherto, as shown in FIG. 8, when a trace is overwritten into the same region, the display picture plane merely becomes complicated. However, according to the present embodiment, as shown in FIG. 9, even if the user successively inputs traces into the same region so as to be overlapped, the drawn trace gradually becomes thin (the brightness decreases), so that the user can distinguish the traces which were overwritten and drawn without mixing up the traces. (In FIG. 9, the brightness of "A" is the lowest and the brightness of "B" is the second-lowest brightness.)

Consequently, in a case of continuously inputting handwriting characters, even if a character overlapping an earlier one is inputted, it is not confused with the earlier character. Therefore, even in a small input region, the next character can be inputted while the previous character trace is still visible.

Therefore, the character input region can be reduced and the apparatus can be miniaturized. Moreover, a larger number of trace information can be recorded in a limited display region.

Further, since the traces can be distinguished with respect to the time, even in an electronic memorandum notebook application or the like, the input time point can be recognized. It is not always necessary to add a date, a time, and the like to the memorandum.

Even in the case of a temporary memorandum, since the trace is deleted with the lapse of time, the trouble of actively deleting the old trace can be omitted.

[Second embodiment]

Figure 10:
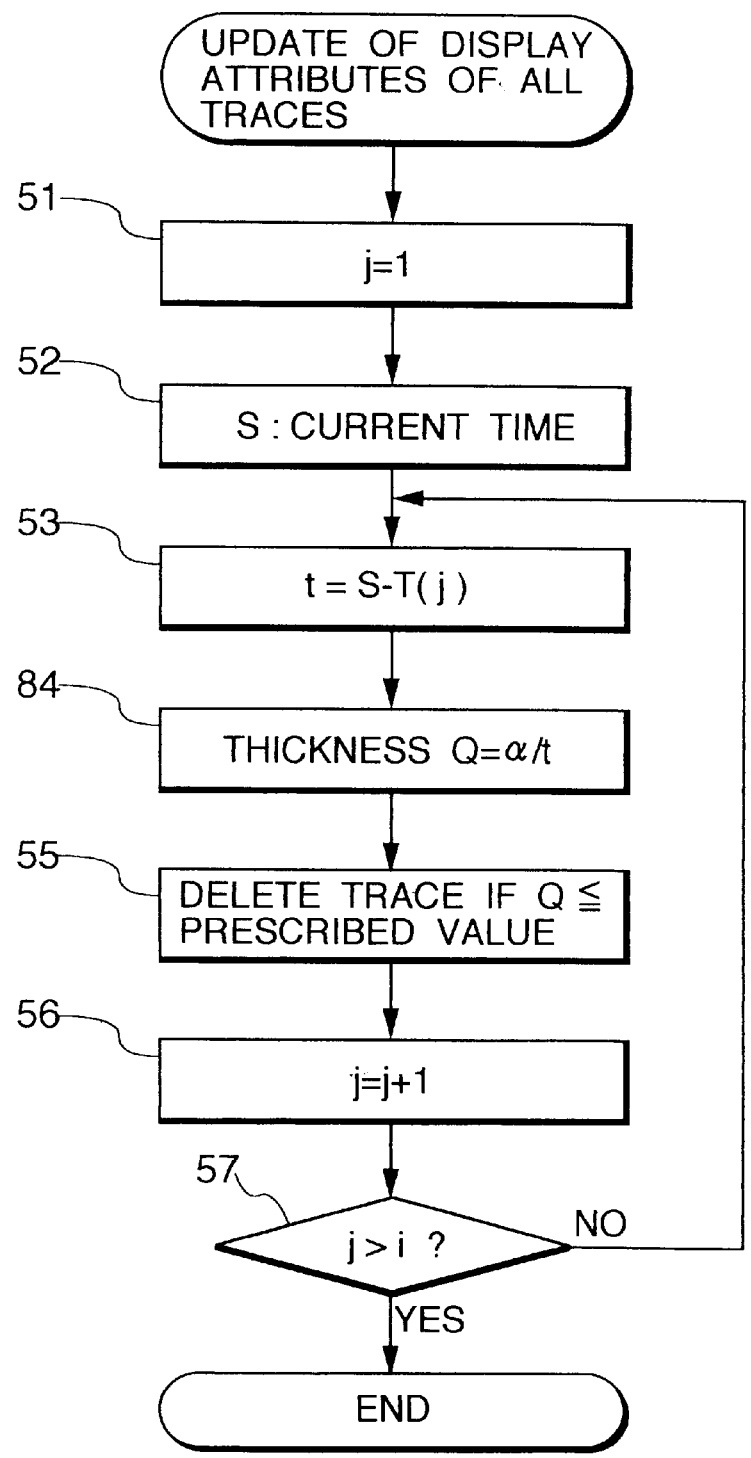
FIG. 10 is a flowchart showing a modification of the process in FIG. 7.

FIG. 10 is a flowchart for a process to change the display attributes of all traces according to the embodiment. The processes other than this process are substantially the same as those in the first embodiment.

The flowchart shown in FIG. 10 is obtained by replacing step 54 in the flowchart shown in FIG. 7 with step 84. In step 84, the thickness of the trace is used as a display attribute of the trace. The other processing steps are similar to those in FIG. 7.

Figure 11:
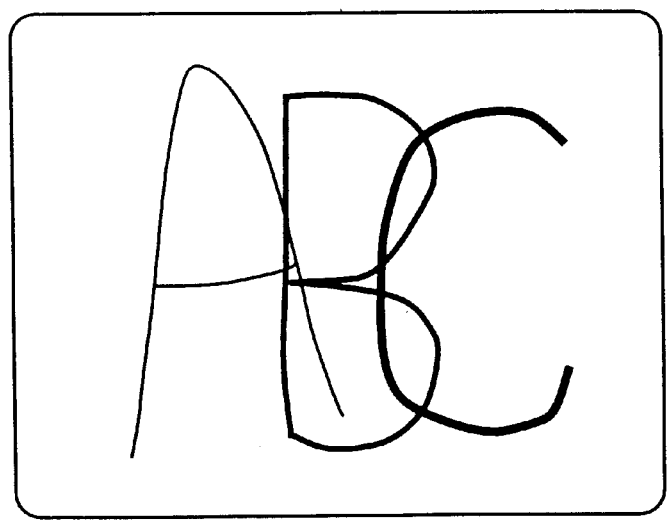
FIG. 11 is a diagram for explaining a display form of a trace.

FIG. 11 shows a display picture plane of the second embodiment and it will be understood that the trace which was inputted first is displayed thinly.

In the first embodiment, changes in brightness cannot be displayed in the case of using a liquid crystal display of only two monochromatic gradations. However, in the present embodiment, since the display attribute is the thickness of trace, an effect similar to that in the first embodiment is obtained irrespective of the number of gradations of the liquid crystal display.

Instead of line brightness or thickness, other display attributes can be controlled in accordance with the lapse of time, in accordance with the invention. For example, the color in which the trace is displayed, can be changed over time.

Also, while the present invention has been particularly discussed with reference to the preferred embodiments thereof, many other modifications and variations will be readily apparent to those of ordinary skill, and the scope of the invention is therefore not to be limited by the details of the described preferred embodiments, but only by the appended claims.

What is claimed is:

1. A data processing apparatus comprising:
   an image inputter;
   memory for storing image information inputted by said image inputter and time information indicating a time when the image information is inputted, in correspondence to respective image information; and
   a display control for judging an elapsed time from the inputting of the image information in accordance with the time information of the image information stored in said memory and for setting display attributes which are calculated on the basis of the elapsed times, in correspondence to respective image information.

2. An apparatus according to claim 1, wherein said display control sets the display attributes by reducing a brightness of the image information with an increase in the elapsed time.

3. An apparatus according to claim 1, wherein said display control sets the display attributes by changing a color of the image information in accordance with the elapsed time.

4. An apparatus according to claim 1, wherein the time information stored in said memory indicates a time point when the inputting of the image information is started.

5. An apparatus according to claim 1, wherein said image inputter comprises a digitizer.

6. An apparatus according to claim 1, further comprising a display controlled by said display control to display the image information.

7. An apparatus according to claim 1, wherein said memory means stores the time information using a time read from a built-in timer.

8. An apparatus according to claim 1, wherein the image information comprises coordinate data.

9. An apparatus according to claim 1, wherein the image information comprises trace data.

10. An apparatus according to claim 1, wherein the image information comprises one set of trace data obtained between a pen-down operation and a pen-up operation.

11. An apparatus according to claim 1, wherein the elapsed time indicates a time duration in which the image information has been displayed.

12. A data processing method comprising the steps of:

inputting image information;

storing the inputted image information and time information indicating a time when the image information is inputted, in correspondence to respective image information;

judging an elapsed time from the inputting of the image information in accordance with the time information of the image information; and setting display attributes which are calculated on the basis of the elapsed times, in correspondence to respective image information.

13. A method according to claim 12, wherein said setting step comprises changing the display attributes by reducing a brightness of the image information with an increase in the elapsed time.

14. A method according to claim 12, wherein said setting step comprises changing the display attributes by changing a color of the image information in accordance with the elapsed time.

15. A method according to claim 12, wherein the stored time information indicates a time point when the input of the image information is started.

16. A method according to claim 12, wherein said inputting step includes inputting the image information using a digitizer.

17. A method according to claim 12, further comprising the step of displaying the image information.

18. A method according to claim 12, wherein said storing step includes storing the time information using a time read from a built-in timer.

19. A method according to claim 12, wherein the image information comprises coordinate data.

20. A method according to claim 12, wherein the image information comprises trace data.

21. A method according to claim 12, wherein the image information comprises one set of trace data obtained between a pen-down operation and a pen-up operation.

22. A method according to claim 12, wherein the elapsed time indicates a time duration in which the image information has been displayed.

23. A tangible memory medium storing executable program code, comprising:

inputting code, for inputting image information;

storing code, for storing the inputted image information and time information indicating a time when the image information is inputted, in correspondence to respective image information;

judging code, for judging an elapsed time from the inputting of the image information in accordance with the time information of the image information; and setting code, for setting display attributes which are calculated on the basis of the elapsed times, in correspondence to respective image information.

24. A memory medium according to claim 23, wherein said setting code is also for changing the display attributes by reducing a brightness of the image information with an increase in the elapsed time.

25. A memory medium according to claim 23, wherein said setting code also is for changing the display attributes by changing a color of the image information in accordance with the elapsed time.

26. A memory medium according to claim 23, wherein the stored time information indicates a time point when the input of the image information is started.

27. A memory medium according to claim 23, wherein said inputting code is for inputting the image information using a digitizer.

28. A memory medium according to claim 23, further comprising displaying code, for displaying the image information.

29. A memory medium according to claim 23, wherein said storing code is for storing the time information using a time read from a built-in timer.

30. A memory medium according to claim 23, wherein the image information comprises coordinate data.

31. A memory medium according to claim 23, wherein the image information comprises trace data.

32. A memory medium according to claim 23, wherein the image information comprises one set of trace data obtained between a pen-down operation and a pen-up operation.

33. A memory medium according to claim 23, wherein the elapsed time indicates a time duration in which the image information has been displayed.

34. A data processing apparatus comprising:

an image inputter;

memory for storing an image inputted by said image inputter and time information indicating a time when the image is inputted; and a display control for judging an elapsed time from the input of the image in accordance with the time information of the image in a case of displaying the image stored in said memory and for controlling so as to change a display attribute of the image in accordance with elapsed time, wherein said display control changes the display attribute by reducing a brightness of the image information with an increase in the elapsed time.

35. A data processing apparatus comprising:

an image inputter;

memory for storing the image inputted by said image inputter and time information indicating a time when the image is inputted; and a display control for judging an elapsed time from the input of the image in accordance with the time information of the image in a case of displaying the image stored in said memory and for controlling so as to change a display attribute of the image in accordance with elapsed time, wherein said display control changes the display attribute by changing a color of the image in accordance with the elapsed time.

36. A data processing method comprising the steps of:

inputting an image;

storing both the inputted image and time information indicating a time when the image is inputted;

judging an elapsed time from the input of the image in accordance with the time information of the image in a case of displaying the image that has been stored; and controlling so as to change a display attribute of the image in accordance with the elapsed time, wherein the display of the image is controlled so as to reduce a brightness of the image with an increase in the elapsed time.

37. A data processing method comprising the steps of:

inputting an image;

storing both the inputted image and time information indicating a time when the image is inputted;

judging an elapsed time from the input of the image in accordance with the time information of the image in a case of displaying the image that has been stored; and controlling so as to change a display attribute of the image in accordance with the elapsed time, wherein the display of said image is controlled so as to change a color of the image in accordance with the elapsed time.

* * * * *

UNITED STATES PATENT AND TRADEMARK OFFICE
CERTIFICATE OF CORRECTION

PATENT NO. : 6,329,991 B1
APPLICATION NO. : 08/632620
DATED : December 11, 2001
INVENTOR(S) : Ryoji Fukuda et al.

It is certified that error appears in the above-identified patent and that said Letters Patent is hereby corrected as shown below:

Please enter claims as shown on the attached pages,

UNITED STATES PATENT AND TRADEMARK OFFICE
CERTIFICATE OF CORRECTION

| | |
|---|---|
| PATENT NO. | : 6,329,991 B1 |
| APPLICATION NO. | : 08/632620 |
| DATED | : December 11, 2001 |
| INVENTOR(S) | : Ryoji Fukuda et al. |

It is certified that error appears in the above-identified patent and that said Letters Patent is hereby corrected as shown below:

<u>COLUMN 2</u>

Line 60, "to the" should read --to construct the--.

<u>COLUMN 4, LINE 47 TO COLUMN 8, LINE 11</u>

Substitute claims 1 through 37 with the following:

--1. A data processing apparatus comprising:
an image inputter adapted to input image information;
a display control adapted to control a display of the inputted image information with display attributes; and
memory for storing image information inputted by said image inputter and time information indicating a time when the image information is inputted, in correspondence to respective image information;
wherein the display control judges an elapsed time from the inputting of the image information in accordance with the time information of the image information stored in said memory and changes the displayed image information to the image information displayed with the display attributes which are set on the basis of the elapsed times, in correspondence to respective image information.

2. An apparatus according to claim 1, wherein said display control changes the display attributes by reducing a brightness of the image information with an increase in the elapsed time.

3. An apparatus according to claim 1, wherein said display control changes the display attributes by changing a color of the image information in accordance with the elapsed time.

UNITED STATES PATENT AND TRADEMARK OFFICE
CERTIFICATE OF CORRECTION

| | |
|---|---|
| PATENT NO. | : 6,329,991 B1 |
| APPLICATION NO. | : 08/632620 |
| DATED | : December 11, 2001 |
| INVENTOR(S) | : Ryoji Fukuda et al. |

It is certified that error appears in the above-identified patent and that said Letters Patent is hereby corrected as shown below:

4. An apparatus according to claim 1, wherein the time information stored in said memory indicates a time point when the inputting of the image information is started.

5. An apparatus according to claim 1, wherein said image inputter comprises a digitizer.

6. An apparatus according to claim 1, further comprising a display controlled by said display control to display the image information.

7. An apparatus according to claim 1, wherein said memory stores the time information using a time read from a built-in timer.

8. An apparatus according to claim 1, wherein the image information comprises coordinate data.

9. An apparatus according to claim 1, wherein the image information comprises trace data.

10. An apparatus according to claim 1, wherein the image information comprises one set of trace data obtained between a pen-down operation and a pen-up operation.

11. An apparatus according to claim 1, wherein the elapsed time indicates a time duration in which the image information has been displayed.

12. A data processing method comprising the steps of:
   inputting image information;
   controlling a display of the inputted image information with display attributes;
   storing the inputted image information and time information indicating a time when the image information is inputted, in correspondence to respective image information;

judging an elapsed time from the inputting of the image information in accordance with the time information of the image information; and
   changing the displayed image information to the image information displayed with display attributes which are set on the basis of the elapsed times, in correspondence to respective image information.

UNITED STATES PATENT AND TRADEMARK OFFICE
CERTIFICATE OF CORRECTION

| | |
|---|---|
| PATENT NO. | : 6,329,991 B1 |
| APPLICATION NO. | : 08/632620 |
| DATED | : December 11, 2001 |
| INVENTOR(S) | : Ryoji Fukuda et al. |

It is certified that error appears in the above-identified patent and that said Letters Patent is hereby corrected as shown below:

13.    A method according to claim 12, wherein said changing step comprises changing the display attributes by reducing a brightness of the image information with an increase in the elapsed time.

14.    A method according to claim 12, wherein said changing step comprises changing the display attributes by changing a color of the image information in accordance with the elapsed time.

15.    A method according to claim 12, wherein the stored time information indicates a time point when the input of the image information is started.

16.    A method according to claim 12, wherein said inputting step includes inputting the image information using a digitizer.

17.    A method according to claim 12, further comprising the step of displaying the image information.

18.    A method according to claim 12, wherein-said storing step includes storing the time information using a time read from a built-in timer.

19.    A method according to claim 12, wherein the image information comprises coordinate data.

UNITED STATES PATENT AND TRADEMARK OFFICE
CERTIFICATE OF CORRECTION

| | |
|---|---|
| PATENT NO. | : 6,329,991 B1 |
| APPLICATION NO. | : 08/632620 |
| DATED | : December 11, 2001 |
| INVENTOR(S) | : Ryoji Fukuda et al. |

It is certified that error appears in the above-identified patent and that said Letters Patent is hereby corrected as shown below:

20. A method according to claim 12, wherein the image information comprises trace data.

21. A method according to claim 12, wherein the image information comprises one set of trace data obtained between a pen-down operation and a pen-up operation.

22. A method according to claim 12, wherein the elapsed time indicates a time duration in which the image information has been displayed.

23. A tangible memory medium storing executable program code, comprising:
   inputting code, for inputting image information;
   control code, for controlling a display of the inputted image information with display attributes;
   storing code, for storing the inputted image information and time information indicating a time when the image information is inputted, in correspondence to respective image information;
   judging code, for judging an elapsed time from the inputting of the image information in accordance with the time information of the image information; and
   setting code, for setting display attributes Which are set on the basis of the elapsed times, in correspondence to respective image information.

24. A memory medium according to claim 23, wherein said setting code is also for changing the display attributes by reducing a brightness of the image information with an increase in the elapsed time.

25. A memory medium according to claim 23, wherein said setting code also is for changing the display attributes by changing a color of the image information in accordance with the elapsed time.

UNITED STATES PATENT AND TRADEMARK OFFICE
CERTIFICATE OF CORRECTION

| | |
|---|---|
| PATENT NO. | : 6,329,991 B1 |
| APPLICATION NO. | : 08/632620 |
| DATED | : December 11, 2001 |
| INVENTOR(S) | : Ryoji Fukuda et al. |

It is certified that error appears in the above-identified patent and that said Letters Patent is hereby corrected as shown below:

26. A memory medium according to claim 23, wherein the stored time information indicates a time point when the input of the image information is started.

27. A memory medium according to claim 23, wherein said inputting code is for inputting the image information using a digitizer.

28. A memory medium according to claim 23, further comprising displaying code, for displaying the image information.

29. A memory medium according to claim 23, wherein said storing code is for storing the time information using a time read from a built-in timer.

30. A memory medium according to claim 23, wherein the image information comprises coordinate data.

31. A memory medium according to claim 23, wherein the image information comprises trace data.

32. A memory medium according to claim 23, wherein the image information comprises one set of trace data obtained between a pen-down operation and a pen-up operation.

33. A memory medium according to claim 23, wherein the elapsed time indicates a time duration in which the image information has been displayed.

34. A data processing apparatus comprising:
   an image inputter for inputting image information;
   a display control for controlling a display of the inputted information with display attributes; and

UNITED STATES PATENT AND TRADEMARK OFFICE
CERTIFICATE OF CORRECTION

| | | |
|---|---|---|
| PATENT NO. | : 6,329,991 B1 | Page 7 of 9 |
| APPLICATION NO. | : 08/632620 | |
| DATED | : December 11, 2001 | |
| INVENTOR(S) | : Ryoji Fukuda et al. | |

It is certified that error appears in the above-identified patent and that said Letters Patent is hereby corrected as shown below:

memory for storing an image inputted by said image inputter and time information indicating a time when the image is inputted;
        wherein the display control judges an elapsed time from the input of the image in accordance with the time information of the image in a case of displaying the image stored in said memory and for controlling so as to change a display attribute of the image in accordance with elapsed time,
        wherein said display control changes the display attribute by reducing a brightness of the image information with an increase in the elapsed time.

35.    A data processing apparatus comprising:
        an image inputter for inputting image information;
        a display control for controlling a display of the inputted image information with display attributes; and
        memory for storing the image inputted by said image inputter and time information indicating a time when the image is inputted;
        wherein the display control judges an elapsed time from the input of the image in accordance with the time information of the image in a case of displaying the image stored in said memory and for controlling so as to change a display attribute of the image in accordance with elapsed time,
        wherein said display control changes the display attribute by changing a color of the image in accordance with the elapsed time.

36.    A data processing method comprising the steps of:
        inputting an image;
        controlling a display of the inputted image information with display attributes;
        storing both the inputted image and time information indicating a time when the image is inputted;
        judging an elapsed time from the input of the image in accordance with the time information of the image in a case of displaying the image that has been stored; and

UNITED STATES PATENT AND TRADEMARK OFFICE
CERTIFICATE OF CORRECTION

| | | |
|---|---|---|
| PATENT NO. | : 6,329,991 B1 | Page 8 of 9 |
| APPLICATION NO. | : 08/632620 | |
| DATED | : December 11, 2001 | |
| INVENTOR(S) | : Ryoji Fukuda et al. | |

It is certified that error appears in the above-identified patent and that said Letters Patent is hereby corrected as shown below:

controlling so as to change a display attribute of the image in accordance with the elapsed time,
       wherein the display of the image is controlled so as to reduce a brightness of the image with an increase in the elapsed time.

37.    A data processing method comprising the steps of:
       inputting an image;
       displaying the inputted image information with display attributes;
       storing both the inputted image and time information indicating a time when the image is inputted;
       judging an elapsed time from the input of the image in accordance with the time information of the image in a case of displaying the image that has been stored; and

UNITED STATES PATENT AND TRADEMARK OFFICE
CERTIFICATE OF CORRECTION

PATENT NO. : 6,329,991 B1
APPLICATION NO. : 08/632620
DATED : December 11, 2001
INVENTOR(S) : Ryoji Fukuda et al.

It is certified that error appears in the above-identified patent and that said Letters Patent is hereby corrected as shown below:

controlling so as to change a display attribute of the image in accordance with the elapsed time,
wherein the display of said image is controlled so as to change a color of the image in accordance with the elapsed time.--.

Signed and Sealed this

Twenty-first Day of November, 2006

JON W. DUDAS
*Director of the United States Patent and Trademark Office*